D. HÄUSSLER.
CONTAINER CLOSURE.
APPLICATION FILED MAY 15, 1914.

1,122,749.

Patented Dec. 29, 1914.

UNITED STATES PATENT OFFICE.

DAVID HÄUSSLER, OF NEW YORK, N. Y.

CONTAINER-CLOSURE.

1,122,749.  Specification of Letters Patent.  Patented Dec. 29, 1914.

Application filed May 15, 1914.  Serial No. 838,629.

*To all whom it may concern:*

Be it known that I, DAVID HÄUSSLER, a citizen of the German Empire, residing at New York city, county of Bronx, and State of New York, have invented a new and useful Improved Container-Closure, of which the following is a specification.

This invention relates to a container closure of novel construction, and more particularly to novel and efficient means for securely holding the cover to its seat and preventing its removal without going through a peculiar manipulation. The invention is well adapted for milk and other food-holding cans, preserve jars, pails, ash cans, cooking utensils, and various other articles, which will readily suggest themselves.

In the accompanying drawing: Figure 1 is a side elevation of a container embodying my invention showing in dotted lines the cover in its raised position. Fig. 2 a rear view thereof, partly in section; Fig. 3 a detail of part of the cover, and adjoining parts; Fig. 4 a similar detail showing the parts in a different position, and Fig. 5 a side view of a modification of the closure.

A can, jar or other container 10, of suitable configuration and made of sheet metal or other material is adapted to be closed by a vertically liftable cover 11. This cover is provided with a depending flange adapted to be projected over the top of the can, and with a pair of diametrically disposed ears 12 carried by said flange. These ears are apertured as at 13, for the accommodation of the shanks 14 of an articulated bail 15 the shanks being pivoted to the parallel members of the bail at 16. Bail 15 straddles the cover 11 so that the latter may be moved by a handle 17 up and down along the bail. Each shank 14, terminates at its lower end in a hook 18, adapted to pivotally engage an eye 19, extending laterally from the body of the container. The correlation of the parts is such that when the cover is closed, the shanks 14, will project a short distance above the ears 12, so that when the body of the bail 15 is folded down, an elbow will be formed between each shank and the bail proper directly above each ear 12 (full lines Fig. 1). This elbow prevents the cover from being lifted up, as long as the bail remains swung down, so that in this way by simply closing the cover and releasing the bail the cover will be effectively held in its closed position. Thus when the invention is applied to say garbage cans, ample provision is made against any accidental or willful knocking off of the cover, so that the contents are not apt to fly about and sanitary conditions are insured. When it is desired to dump the can, the bail is swung up (dotted lines Fig. 1) so that its parallel members again become alined with its shanks, thereby permitting the cover to be slid up along the bail. So also should it be deemed necessary, the cover after being thus opened may be entirely disconnected from the can by unhooking its bail therefrom.

When the invention is applied to milk and other food cans, means should be provided for forcing the cover down in an air tight manner. For this purpose the cover is provided with an annular gasket 20 which is accommodated within a corresponding groove formed on the lower side of the cover. Furthermore the bail 15 is provided at each end, with a cam 21, adapted to engage ear 12, when the bail is swung down, and to pass freely through said ear when the bail is swung up, for which purpose pose each ear is provided with a slot 22, communicating with aperture 13.

In operation the cover is closed, and the bail is swung down, so that the cams will be turned away from slot 22 (Fig. 2) into the position shown in Fig. 1, to press the cover tightly down and press gasket 20 against the upper edge of container 10. When the bail is swung up, the cams will by such motion be made to release the ears and to be brought into alinement with slots 22 (Fig. 3) so that the cover may now be slid up along the bail in manner previously described.

If desired, means may also be provided for locking the cover in its closed position. These means are shown to consist of an apertured lug 23, on the bail which is adapted to be swung against a similar lug carried the container, and of a padlock passing both of said lugs. By this construction it is of course impossible to right the bail without opening the lock, and consequently it is impossible for an unauthorized person to unseat the cover.

As shown the cams 21 are in the form of key bits, while shown of bayonet-shape, so that in that case they can freely swing out to engage the ears without interference from the slots.

With the construction shown the cover is likewise held to its seat by means of the articulated bail, but the cams and other means for jamming the cover down are omitted. This construction is therefore well adapted for ash cans and similar articles, the contents of which do not require to be especially guarded.

It should be noted that the spread of the bail is greater than the diameter of the cover or can body, so that when the container is closed, the bail will clear the cover and will be swung against the side of the can body. In this way the bail will form an acute angle with the shanks 14, which materially increases its locking effect while furthermore it is entirely impossible to lift the cover, before the bail has been righted by a separate and distinct manipulation.

Furthermore the cam 21 with the construction shown in Figs. 1–4 will constitute a spur that extends from the bail beyond its pivot 16 and which will in the closed position of the parts constitute a cross piece that projects across the ear and prevents the cover from being lifted until the bail has been completely righted, or swung into a true vertical position. With the construction shown in Fig. 5, the bail is extended a distance beyond the pivot, to constitute a spur having a similar effect.

I claim:

1. A container provided with a cover having a pair of diametrically extending ears, a pair of shanks secured to the container body and extending upwardly through said ears, a bail pivoted to the upper ends of the shanks and having a spread which is greater than the diameter of the can, said bail being adapted to be folded beneath the cover against the can body at an acute angle to the shanks.

2. A container provided with a cover having a pair of diametrically extending ears, a pair of shanks secured to the container body and extending upwardly through said ears, a bail pivoted to the upper ends of the shanks and having a pair of depending spurs, said bail being adapted to be folded beneath the cover against the can body, while the spurs are adapted to extend across the ears.

3. A container provided with a cover, a pair of apertured ears on the cover, a bail, a pair of shanks pivoted to the bail and adapted to pass through the ears, means for pivotally connecting said shanks to the container, and a pair of cams on the bail adapted to engage said ears.

4. A container provided with a cover, a pair of apertured ears on the cover, a bail, a pair of shanks pivoted to the bail and adapted to pass through the ears, means for pivotally connecting said shanks to the container, a pair of cams on the bail adapted to engage the ears, apertured lugs on the bail and container and a lock adapted to engage said lugs.

DAVID HÄUSSLER.

Witnesses:
RICHARD SCHMIDT,
FRANK V. BRIESEN.